United States Patent [19]

Han et al.

[11] 4,241,603

[45] Dec. 30, 1980

[54] AIRCRAFT BRAKE THERMAL SENSOR

[75] Inventors: Benjamin C. P. Han, South Bend; Floyd P. Weldy, Bourbon, both of Ind.

[73] Assignee: The Bendix Corporation, Southfield, Mich.

[21] Appl. No.: 8,907

[22] Filed: Feb. 2, 1979

[51] Int. Cl.³ .............................................. G01L 5/28
[52] U.S. Cl. ..................................... 73/129; 188/1 A
[58] Field of Search ........................... 73/129, 359 R; 340/52 A, 52 B; 188/1 A

[56] References Cited

U.S. PATENT DOCUMENTS

| 2,839,594 | 6/1958 | Schneidersmann | 73/359 X |
|---|---|---|---|
| 3,297,985 | 1/1967 | Trebonsky et al. | 340/69 |
| 3,321,045 | 5/1967 | Veilleux | 188/1 |
| 3,398,246 | 8/1968 | Linet | 200/61.4 |
| 3,556,258 | 1/1971 | Winge | 188/1 |
| 3,674,114 | 7/1972 | Howard | 340/52 AX |
| 4,016,533 | 4/1977 | Ishikawa et al. | 340/52 A |

*Primary Examiner*—Jerry W. Myracle
*Attorney, Agent, or Firm*—Leo H. McCormick, Jr.; Ken C. Decker

[57] ABSTRACT

An aircraft brake includes a stack of rotors and stators located between a backing plate and a pressure plate. A brake thermal sensor includes a probe carried by the backing plate generating a signal representing the temperature of a backing plate friction pad. A temperature indicator connected to the probe is actuated by the probe signal to monitor the temperature of the friction pad. The probe includes a heat conductor which conducts heat from the friction pad to a temperature responsive device embedded in the heat conductor. The temperature responsive device generates the probe signal. A spring is biased to maintain the heat conductor in engagement with the friction pad so that the friction pad temperature is continuously monitored. A heat insulator limits the heat loss from the heat conductor.

5 Claims, 2 Drawing Figures

AIRCRAFT BRAKE THERMAL SENSOR

BACKGROUND OF THE INVENTION

Some airlines require that an aircraft be equipped with a temperature monitoring system which is capable of monitoring the temperature of the aircraft brake so that the pilot can be assured that the brakes are cool enough to provide a safe "rejected take-off" capability when the aircraft takes off.

The major problem in existing aircraft brake thermal sensors is the "time-lag" of the monitored or indicated temperature with respect to the actual brake temperature. This time lag is due to the face that the thermal sensors have heretofore been located away from the hottest part of the brake. Due to the location of the sensors, they tend to be affected by heat sources other than the brake, and may also be affected by contamination from the environment.

SUMMARY OF THE INVENTION

It is an object of this invention to provide an aircraft brake temperature monitoring device which assures a safe "rejected take-off" capability before the aircraft takes off.

It is an object of this invention to minimize the "time lag" between the actual brake temperature and the recorded temperature and thus, to provide an accurate temperature measurement.

It is an object of this invention to provide a thermal sensor which continuously picks up heat directly from the brake.

It is an object of this invention to minimize the heat loss from the thermal sensor.

It is an object of this invention to protect the thermal sensor from contamination from its environment.

Finally, it is an object of this invention to provide a thermal sensor which utilizes readily available parts and which can be firmly secured to the brake.

The aircraft brake thermal sensor disclosed herein has a thermocouple embedded in a copper plunger surrounded by a heat insulating sleeve in a bore in a housing. The housing fits into a bore in a backing plate adjacent a friction pad and is secured to the backing plate with a lock nut. A cap closes one end of the housing and protects the plunger from outside contamination. A spring between the cap and the plunger biases the plunger into engagement with the friction pad at the other end of the housing. The copper plunger conducts heat from the friction pad to the thermocouple. The insulating sleeve limits heat loss from the plunger. A pair of electrical conductors communicate a signal corresponding to the friction pad temperature from the thermocouple to an indicator in the cockpit of the aircraft.

DETAILED DESCRIPTION

Figure 1:
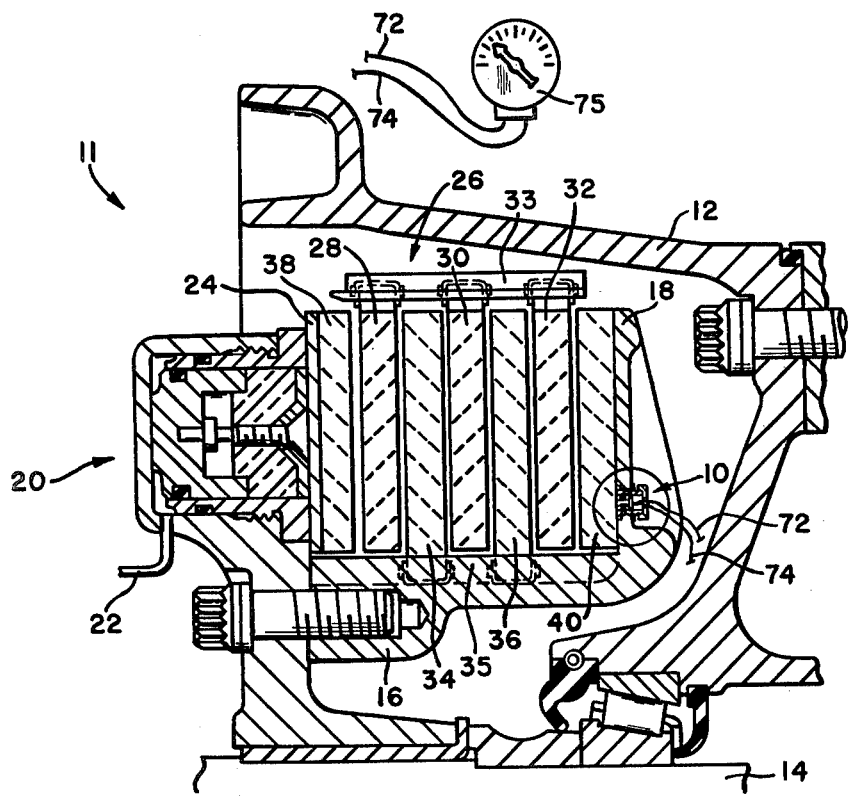
FIG. 1 is a cross-section view of an aircraft brake assembly showing the location of the heat sensor which is the subject of this invention.

FIG. 1 illustrates an aircraft brake thermal sensor 10 in an aircraft brake assembly 11 associated with a wheel rim 12 rotating about an axle 14. A non-rotating torque tube 16 is carried by the axle 14. The torque tube 16 carries a backing plate 18 and a piston actuator 20. Conduit 22 communicates hydraulic fluid into the piston actuator to move pressure plate 24 toward the backing plate 18. A braking stack 26 includes rotor friction discs 28, 30 and 32 mounted for rotation with the wheel rim 12 by spline 33 and non-rotating stator friction discs 34 and 36 mounted on torque tube 16 by splines 35. Non-rotating friction discs 38 and 40 are carried by pressure plate 24 and backing plate 18, respectively.

Thermal sensor 10 is carried by backing plate 18 to monitor the temperature of friction disc 40 as friction between the rotating friction discs 28, 30 and 32 and non-rotating friction discs 34, 36, 38, and 40 causes friction disc 40 to heat up during brake application.

Figure 2:
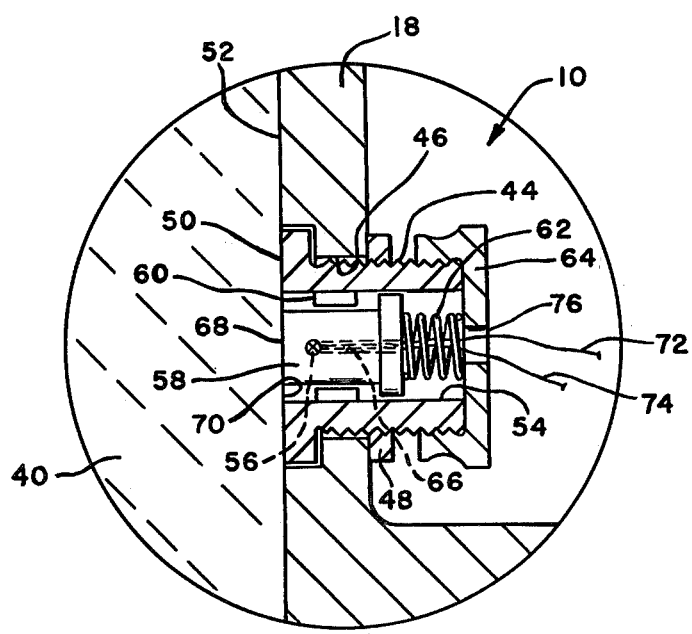
FIG. 2 is an enlarged cross-sectional view of the circumscribed portion of FIG. 1 showing in detail the heat sensor device.

Turning now to FIG. 2, thermal sensor 10 includes a housing 44 carried by backing plate 18 in a stepped bore 46 of the backing plate 18. Housing 44 is releasably attached to the backing plate 18 by lock nut 48 so that the housing end surface 50 is flush with backing plate surface 52. Housing 44 has a bore 54 therein for retaining a thermocouple 56, a copper plunger 58, a heat insulating sleeve 60, a spring 62, and a cap 64.

Thermocouple 56 is embedded in bore 66 in plunger 58 near plunger end 68 adjacent friction disc 40. The cylindrical heat insulating sleeve 60 circumferentially surrounds the plunger 58, and thermally insulates the plunger 58 from the housing 44 to prevent plunger 58 from contacting the housing 44. Cap 64 which encloses the end of the housing 44 opposite friction disc 40, isolates the interior of the housing 44 from the exterior environment. The spring 62 is disposed within bore 54 between cap 64 and plunger 58 to urge plunger end 68 in continuous parallel engagement with surface 70 of friction disc 40. Thermocouple 56 is connected with an indicator 75 by a pair of electrical conductors 72, 74 that extends through plunger bore 66, housing bore 54 and a cap opening 76.

A thermal sensor 10 was constructed utilizing a commercially available K-type Chromel-Alumel thermocouple and a heat insulating sleeve constructed out of Micalex or Ceramic heat insulating material.

MODE OF OPERATION

On an aircraft brake application, hydraulic fluid is introduced via conduit 22 into piston actuator 20 to force pressure plate 24 to move toward backing plate 18. This motion forces the rotating and non-rotating friction discs of braking stack 26 into frictional engagement to cr a frictional force opposing the rotation of the rotating friction discs 28, 30, and 32 attached to the wheel rim 12.

This friction causes the friction discs, including friction disc 40, to heat up. Copper plunger 58 conducts heat from friction disc 40 to thermocouple 56 embedded in bore 66 in plunger 58. The thermocouple 56 responds to the heat communicated to it and in a well-known manner generates an electrical signal corresponding to its temperature. Spring 62 holds plunger 58 in continuous engagement with friction disc 40 and thermocouple 56 is positioned within plunger 58 near plunger end 68. Insulating sleeve 60 prevents heat loss from the plunger 58 to the housing 44. As a result, the thermocouple temperature is nearly the same as the temperature of plunger 58 and thus, the temperature of friction disc 40. Therefore, the thermocouple electrical signal corresponds closely to the temperature of friction disc 40.

Finally, wires 72 and 74 conduct the electrical thermocouple signal from the thermocouple 56 to a temperature indicator means 75 located in the cockpit of the aircraft.

We claim:

1. In a brake, a member to be braked, a backing plate disposed adjacent the member to be braked, a friction pad carried by the backing plate for engagement with the member to be braked, probe means carried by said backing plate for generating a probe signal representing the temperature of the friction pad, the probe means including temperature responsive means for generating the probe signal and heat conducting means for conducting heat from the friction pad to the temperature responsive means;

the improvement wherein said probe means includes a housing carried by the backing plate, said housing defining a bore therewithin, said heat conducting means being disposed within said bore, said heat conducting means engaging the friction pad at an open end of said housing, said probe means also including heat insulating means for insulating said heat conducting means from said housing to limit the heat loss from said heat conducting means.

2. The device of claim 1 wherein;

said temperature responsive means is disposed within said heat conducting means.

3. The probe means of claim 1, further comprising:

resilient means for maintaining said heat conducting means in engagement with the friction pad to continuously monitor the temperature of the friction pad.

4. In a brake, a member to be braked, a backing plate disposed adjacent the member to be braked, a friction pad carried by the backing plate for engagement with the member to be braked, probe means carried by said backing plate for generating a probe signal representing the temperature of the friction pad, the probe means including temperature responsive means for generating the probe signal and heat conducting means for conducting heat from the friction pad to the temperature responsive means, the improvement wherein:

said heat conducting means is comprised of a plunger with a flat end surface;

said probe means including a spring biased to retain said plunger end surface in continuous engagement with a surface of said friction pad so that the temperature of said friction pad is continuously monitored, said probe also including a housing releasably fastened to the backing plate, said housing having a bore extending therethrough, said plunger being disposed within said bore and engaging the friction pad at an open end of said housing;

a sleeve of heat insulating material being disposed within said housing, said sleeve isolating said plunger from said housing to limit the heat loss from said plunger, said sleeve, plunger and spring cooperating to retain said plunger end face in parallel engagement with said friction pad surface;

said temperature responsive means being comprised of a thermocouple disposed within a bore in said plunger; and a cap releasably enclosing an end of said housing opposite said open end, said spring being disposed between said cap and said plunger.

5. The device of claim 4 wherein;

said housing is comprised of a cylindrical portion and a flange portion, said housing bore extending axially through both of said portions, said housing engaging the backing plate through an opening in the backing plate, said flange portion mating with a countersunk portion of the backing plate, said housing being releasably fastened to the backing plate; and said cap releasably engaging said cylindrical portion to isolate said plunger from the environment exterior to said housing.

* * * * *